United States Patent [19]

Hinz et al.

[11] Patent Number: 5,374,667
[45] Date of Patent: Dec. 20, 1994

[54] PROCESS FOR THE PREPARATION OF FLUOROCHLOROHYDROCARBON-FREE, LOW-DENSITY POLYURETHAN SOFT FOAMS AND SOFT ELASTIC POLYURETHAN MOLDING FOAMS AND POLYISOCYANATE MIXTURES MODIFIED WITH URETHAN GROUPS ON DIPHENYLMETHANE-DIISOCYANATE BASE

[75] Inventors: Werner Hinz, Frankenthal; Ruth Zschiesche, Mannheim; Heinz-Dieter Lutter, Neckargemuend; Bernd Bruchmann, Ludwigshafen, all of Germany

[73] Assignee: BASF Aktiengesellschaft, Ludwigshafen, Germany

[21] Appl. No.: 24,589

[22] Filed: Mar. 1, 1993

[30] Foreign Application Priority Data

Feb. 27, 1992 [DE] Germany ............... 4205934

[51] Int. Cl.$^5$ ............................................ C08G 18/00
[52] U.S. Cl. ........................ 521/159; 521/160; 521/174; 521/914
[58] Field of Search ............ 521/120, 137, 159, 170, 521/160, 174, 914; 252/182.2, 182.24, 182.27

[56] References Cited

U.S. PATENT DOCUMENTS

| | | |
|---|---|---|
| 3,336,242 | 8/1967 | Hampson . |
| 3,644,457 | 2/1972 | König . |
| 3,981,828 | 9/1976 | Demou et al. ............... 521/110 |
| 4,055,548 | 10/1977 | Carleton . |
| 4,229,347 | 10/1980 | Holt . |
| 4,334,032 | 6/1982 | Patton, Jr. et al. ............ 521/115 |
| 4,478,960 | 10/1984 | Buethe . |
| 4,972,002 | 11/1990 | Volk et al. ................. 521/120 |

FOREIGN PATENT DOCUMENTS

| | | |
|---|---|---|
| 2346996 | 4/1974 | European Pat. Off. . |
| 2513793 | 10/1975 | European Pat. Off. . |
| 2513796 | 10/1975 | European Pat. Off. . |
| 2444166 | 3/1976 | European Pat. Off. . |
| 2624526 | 12/1977 | European Pat. Off. . |
| 0010850 | 5/1980 | European Pat. Off. . |
| 002617 | 1/1981 | European Pat. Off. . |
| 0022617 | 1/1981 | European Pat. Off. . |
| 011121 | 6/1984 | European Pat. Off. . |
| 0398304 | 11/1990 | European Pat. Off. . |
| 2383976 | 10/1978 | France . |
| 1064576 | 4/1967 | United Kingdom . |
| 1079105 | 8/1967 | United Kingdom . |
| 1369334 | 10/1974 | United Kingdom . |

*Primary Examiner*—Maurice J. Welsh
*Assistant Examiner*—Shelley A. Dodson
*Attorney, Agent, or Firm*—Mary E. Golota

[57] ABSTRACT

The invention provides a method for the preparation of fluorochlorohydrocarbon(FCHC)-free polyurethane soft (molded) foam materials with low density, by reacting A) liquid polyisocyanate mixtures containing bound urethane groups, containing 22 to 30 weight percent of NCO groups, which in turn are prepared by reacting a mixture of diphenylmethane-diisocyanate and polyphenyl-polymethylene-polyisocyanates (raw MDI) with at least one polyoxypropylene-polyoxyethylene-polyol with a functionality between 2.5 and 3.5, a hydroxyl number between 50 and 90 and a polymerized ethylene oxide group concentration ranging from more than 30 to less than 50 weight percent, relative to the weight of the polymerized ethylene oxide and 1,2 propylene oxide groups, or by reacting of 4,4'diphenylmethane-diisocyanate (MDI) or and MDI-isomeric mixture with the above-named polyoxypropylene-polyoxyethylene-polyol to an NCO-group-containing quasi-prepolymer, and diluting this quasi-prepolymer with raw-MDI, with B) higher-molecular polyhydroxyl compounds and, if appropriate C) low-molecular chain lengthening and/or cross-linkage-promoting materials D) propellants, E) catalysts as well as if appropriate, F) auxiliary materials and/or additives, as well as the polyisocyanate mixtures modified with urethane groups (A) which are utilizable in accordance with the process of the invention.

12 Claims, No Drawings

PROCESS FOR THE PREPARATION OF FLUOROCHLOROHYDROCARBON-FREE, LOW-DENSITY POLYURETHAN SOFT FOAMS AND SOFT ELASTIC POLYURETHAN MOLDING FOAMS AND POLYISOCYANATE MIXTURES MODIFIED WITH URETHAN GROUPS ON DIPHENYLMETHANE-DIISOCYANATE BASE

DESCRIPTION

Subject of the invention is a process for the preparation of low-density fluorochlorohydrocarbon-free polyurethan soft foams and soft elastic polyurethan molding foams by the reaction of otherwise known starting materials, however using special liquid polyisocyanate mixtures modified with urethan groups on diphenylmethane-diisocyanate (MDI) base, with an isocyanate content of 22 to 30 weight %; in turn, these mixtures are prepared by the reaction of a mixture consisting of diphenylmethane-diisocyanates and polyphenyl-polymethylene-polyisocyanates (raw MDI) with at least one polyoxypropylene-polyoxyethylene-polyol having a functionality of 2.5 to 3.5, a hydroxyl number of 50 to 90, and a polymerized ethylene groups content of more than 30 to less than 50 weight percent with respect to the alkylene oxide groups, or by the reaction of 4,4'-MDI or a mixture of MDI isomers with the indicated polyoxypropylene-polyoxyethylene-polyol to form a quasiprepolymer containing NCO groups and the dilution of this quasiprepolymer with raw MDI and similar liquid polyisocyanate mixtures containing urethan groups in the bound form.

The preparation of soft polyurethan foams and soft elastic polyurethan molding foams by the reaction of higher-molecular polyhydroxyl compounds, preferably of polyester- or polyether-polyols and possibly of chain-extending and/or cross-linking agents, with organic or/and modified organic polyisocyanates is known and has been described in a number patents and articles published in the literature.

The Plastics Manual, Volume VII, Polyurethans, Carl Hanser Publishers, Munich, First edition, published by Dr. Vieweg and Dr. A. Höchtlen and Second edition, published Dr. G. Oertel may be cited as an example.

By a suitable choice of the structural components and their mass relationships, soft polyurethan foams possessing excellent mechanical properties, especially high tensile strength and high compression resistance, may be obtained.

According to information given in DE-C-1520737 (US-A-3 336 242), polyurethan foams with an open cell structure may be prepared by reacting polyisocyanates with polyoxypropylene-polyoxyethylene-triols having a molecular weight in the 3000 to 8000 range and containing as the terminal unit 3 to 8 weight percent ethylene oxide and glycerol as starter molecule in the bound form.

According to GB-A-1 079 105, very soft polyurethan foams are obtained from a polyether-polyol or a polyether mixture with a hydroxyl number of 70 to 170, containing a trifunctional polyoxyalkylene-polyol, such as oxypropylated glycerol and up to 40 weight percent of polyoxyalkylene glycol, preferably toluylenediisocyanate (TDI), in the presence of water and a fluorochlorohydrocarbon, preferably trichlorofluoromethane, as propellant. In addition, flexible polyurethan foams are described in GB-A-1 064 576. According to the information in this patent specification, organic diisocyanates, preferably TDI, are brought to reaction in the presence of water with a 50 to 90 weight percent mixture of a polyoxyalkylene-triol with a hydroxyl number of 30 to 170 and 10 to 50 weight percent of a polyoxyalkylene-diol with a hydroxyl number of 40 to 110, whereby the mixture has a primary hydroxyl group content of 10 to 65%.

The preparation at room temperature of diphenylmethane-diisocyanate compositions, which are liquid at room temperature, is also known.

According to the information contained in DE-C-16 18 380 (US-A-3 644 457), one mole 4,4' or 2,4'-MDI with 0.1 to 0.3 mole tri-1,2-oxypropylene-glycol and/or poly-1,2-oxypropylene-glycol with a molecular weight of 700 are brought to reaction in this case. According to GB-A-1 369 334 the modification is carried out in two reaction stages and dipropylene glycol or polyoxypropylene glycol with a molecular weight below 2000 is used as modifying agent.

DE-A-29 13 126 (US-A-4 229 347) describes MDI compositions, in which 10 to 35 weight percent of the isocyanate groups with a mixture of at least 3 alkylene glycols are reacted and whereby one of these glycols is di-, tri-, or a higher-molecular polypropylene glycol.

On the other hand, in DE-A-24 44 166 (GB-A- 1430 455), mixtures of a polyoxyethylene glycol or a polyoxyethylene glycol mixture with an average molecular weight below 650 and at least one alkylene glycol with at least 3 carbon atoms were indicated as modifying agents.

DE-A-23 46 996 (GB-A-1 377 679) refers to MDI compositions, in which 10 to 35 weight percent of the isocyanate groups are reacted with a commercial polyoxyethylene glycol. As far as the preparation of liquid polyisocyanate compositions, the combined use of raw MDI was described in addition to MDI and glycols and/or polyoxyalkylene glycols.

According to EP-A-10 850, such a polyisocyanate composition consists of MDI mixed with raw MDI modified with polyoxyalkylene-polyols with a functionality of 2 to 3 on a polyoxypropylene-polyol and if applicable, polyoxyethylene polyol base with molecular weights from 750 to 3000.

According to DE-B-27 37 338 (US-A-4 055 548), a liquid raw MDI composition is obtained by the combination of raw MDI with a polyoxyethylene glycol having an average molecular weight of 200 to 600.

According to the specifications given in DE-B-26 24 526 (GB-A-1 550 325), a raw MDI, prepared according to a special process and containing 88 to 95 weight percent MDI, is reacted with polyoxypropylene glycol within the molecular weight in the range of 134 to 700.

Documents DE-A-25 13 796 (GB-A-1 444 192) and DE-A-25 13 793 (GB-A-1 450 660) concern raw MDI compositions, in which the raw MDI is modified with alkylene or polyoxyalkylene-glycols in definite amounts.

The mentioned alkylene or polyoxyalkylene-glycols indeed liquify the 4,4', respectively 2,4'-MDI isomers, which melt at 42° C., respectively 28° C. However, there is the disadvantage that at 10° C. after long storage periods the polyisocyanate compositions exhibit crystalline precipitations.

It is also known how to prepare soft polyurethan foams, using raw MDI compositions modified by urethan groups as the polyisocyanate component.

According to the specifications of EP-A-22 617, a bi- to trifunctional polyoxypropylene-polyoxyethylene-polyol with a polymerized oxyethylene groups content of at least 50 weight percent is brought to react with a mixture of MDI isomers and the obtained quasi-prepolymer is subsequently diluted with raw MDI. However, the described polyurethan foams possess in particular a low tensile strength and tear propagation resistance.

Polyisocyanate mixtures modified by urethan groups on basis of raw MDI with a 12 to 30 weight percent NCO groups content are described also in EO-B-0 111 121 (US-A-4 478 960). In order to modify the MDI or the raw MDI, a polyoxypropylene-polyoxyethylene-polyol with a functionality of 2 to 4, a hydroxyl number of 10 to 65 and 5 to 30 weight percent polymerized ethylene oxide units content was used. Using these polyisocyanate mixtures modified with urethan groups, polyurethan foams with increased elongation upon tearing, improved tensile strength and tear propagation resistance may be prepared. The only disadvantage of these polyurethan foams that fluorochlorohydrocarbons must be used as propellant for their preparation.

The purpose of this invention is to develop a process for the preparation of soft polyurethan foams or flexible soft polyurethan molding foams exhibiting low density and good mechanical properties, in particular low compressive strength. In the foam formation the use of physical propellants should be largely avoided and the application of fluorochlorohydrocarbons, which damage the environment, should be completely eliminated. Water should be used preferably as propellant; it reacts with isocyanate groups under the formation of carbon dioxide, the actual propellant gas. A good mutual compatibility of the components of the polyurethan system and a good miscibility of the reaction mixture with polar or nonpolar propellants, especially with water, must be ensured.

These measures enhance the safe processing of the polyurethan system, regardless what foam manufacturing process is used, and the foam wastes are minimized.

It was found surprisingly that this problem can be solved by using a special polyisocyanate mixture, modified with urethan groups on an MDI base as the polyisocyanate component, and water as the specially preferred propellant when the polyurethan foam is prepared.

Thus, the subject of this invention is a process for the preparation of fluorochlorohydrocarbon-free soft polyurethan foams and soft flexible polyurethan molding foams by the reaction of A) liquid polyisocyanate mixtures, which contain urethan groups in the bound form on a diphenylmethane-diisocyanate base, with
B) higher-molecular polyhydroxyl compounds and
C) possibly with lower-molecular chain-extending and/or cross-linking agents in the presence of
D) propellants
E) catalysts and also possibly
F) in the presence of auxiliary materials and/or additives characterized by the fact that the liquid polyisocyanate mixture containing the urethane groups (A) in the bound form have an NCO-group content of 22 to 40 weight percent with respect to the total weight and are obtained I) by reacting a) a mixture (I) consisting of diphenylmethane-diisocyanates and polyphenyl-polymethylene-polyisocyanates (raw MDI) possessing a diphenylmethane-diisocyanate (MDI) isomers content of 35 to 94 weight percent with respect of the total weight, having
b) at least one polyoxypropylene-polyoxyethylene-polyol (b) with a functionality of 2.5 to 3.5, with a hydroxyl number of 50 to 90 and a polymerized ethylene oxide groups content ranging from more than 30 to less than 50 weight percent with respect to the polymerized ethylene oxide and 1,2-propylene oxide groups or II) by diluting c) a urethan-groups-containing quasiprepolymer with an NCO content ranging from 10 to 19 weight percent, obtained by reacting a 4,4'-diphenylmethane diisocyanate (MDI) or a mixture of diphenylmethane diisocyanate (MDI) isomers (II) with the aforementioned polyoxypropylene-polyoxyethylene-polyol (b) with a mixture (I) consisting of diphenylmethane-diisocyanates and polyphenyl-polymethylene-polyisocyanates (raw MDI).

Additional subjects of the process according to the invention are the liquid polyisocyanate mixtures on diphenylmethane-diisocyanate base with an NCO group content of 22 to 30 weight percent, that can be used for the preparation of the fluorochlorohydrocarbon-free soft polyurethan molding foams; these mixtures can be obtained I) by reacting a) a mixture (I) consisting of diphenylmethane diisocyanates and polyphenyl-polymethylene-polyisocyanates (raw MDI) with a diphenylmethane-diisocyanate isomers (MDI) content of 35 to 94 weight percent with respect of the total weight, having
b) at least one polyoxypropylene-polyoxyethylene-polyol (b) with a functionality of 2.5 to 3.5, with a hydroxyl number of 50 to 90 and a polymerized ethylene oxide groups content ranging from more than 30 to less than 50 weight percent with respect to the polymerized ethylene oxide and 1,2-propylene oxide groups or II) by diluting c) a urethan-groups-containing quasiprepolymer with an NCO content ranging from 10 to 19 weight percent, obtained by reacting a 4,4'-diphenylmethane-diisocyanate (MDI) or a mixture of diphenylmethane-diisocyanate (MDI) isomers (II) with the aforementioned polyoxypropylene-polyoxyethylene-polyol (b) with a) the aforementioned mixture (I) consisting of diphenylmethane-diisocyanates and polyphenyl-polymethylene-polyisocyanates (raw MDI) with a diphenylmethane-diisocyanate (MDI) isomers content of 35 to 94 weight percent, with respect to the total weight.

The soft polyurethan (molding) foams, prepared by using the polyisocyanate mixtures (A) modified with urethan groups according to the process described in the invention, possess in spite of the relatively low density a high level of mechanical properties.

It was not possible to obtain soft polyurethan foams with comparable good results by using polyoxypropylene-polyoxyethylene-polyols with other 1,2-propylene oxide - ethylene oxide volume ratios, other hydroxyl numbers, and other functionalities for the modification of the polyisocyanate mixture on an MDI base. In particular, it should be emphasized that the compressive strength of the soft polyurethan (molding) foams prepared according to the invention is low, since in view of the increased portion of urea residues soft polyurethan foams prepared with carbon dioxide from water are deliberately too hard. In view of the balanced ratio of hydrophilic ethylene oxide to hydrophobic 1,2 propylene oxide units in polyoxypropylene-polyoxyethylene-polyol (b), the components of the system are with each other, or the reaction mixture with polar propellants, such as water or compounds containing carboxyl groups, or with nonpolar propellants, for example alkanes or fluoroalkanes, equally well compatible, and the reaction mixtures can be processed on various types of foam making installations without any problem.

The following details should be mentioned concerning the preparation of new liquid polyisocyanate mixtures on MDI base (A), containing urethan groups in the bound form and concerning the process according to the invention to prepare the other structural components (B) to (F), which can be used to obtain fluorochlorohydrocarbon-free soft polyurethan (molding) foams: The following raw MDI (I) and MDI isomers (II) mixtures are used advantageously to prepare new polyisocyanate mixtures (A), containing liquid urethan groups in the bound form, preferably with an NCO groups content of 22 to 30 weight percent, preferably with 25 to 29 weight percent:

Suitable mixtures (I) of diphenylmethane-diisocyanates and polyphenyl-polymethylene-polyisocyanates, usually called raw MDI, have next to other homologues an MDI isomers content of 35 to 94 weight percent, preferably 59 to 85 weight percent. Raw MDI, which contain or consist mainly of the following materials with respect to the total weight, were found to be especially outstanding:

Ia1) 34 to 65, preferably 51 to 65 weight percent 4,4'-MDI,

Ia2) 1 to 25, preferably 8 to 20 weight percent 2,4'-MDI,

Ia3) 0 to 4, preferably 0.5 to 2,5 weight percent 2,2'-MDI, and

Ia4) 65 to 6, advantageously 41 to 15, preferably 38 to 29 weight percent at least trifunctional polyphenyl-polymethylene-polyisocyanate.

MDI isomers mixtures contain suitably or consist mainly of the following amounts with respect to the total weight:

IIa1) 90 to 48, preferably 80 to 60 weight percent 4,4'-MDI

IIa2) 10 to 48, preferably 20 to 40 weight percent 2,4'-MDI and

IIa3) 0 to 4, preferably 0 to 4.5 weight percent 2,2'-MDI.

The polyoxypropylene-polyoxyethylene-polyols (b), which according to the invention may be used as modifiers, possess a functionality of 2.5 to 3.5, preferably from 2.5 to 3.0, a hydroxyl number of 50 to 90, preferably from 65 to 75, and a polymerized ethylene oxide groups content of more than 30 to less than 50, preferably 31 to 49, and especially 45 to 49 weight percent, with respect to the total weight of the polymerized ethylene oxide and 1,2-propylene oxide groups. Thereby, the polymerized 1,2-propylene oxide and ethylene oxide groups may serve as central or terminal blocks or in the middle in statistical distribution bound to terminal 1,2-propylene oxide and ethylene oxide groups. Polyoxypropylene-polyoxyethylene-polyols containing the polymerized 1,2-propylene oxide and ethylene oxide groups in statistical distribution in the bound form and having a secondary hydroxyl group content of at least 50%, preferably 60% and in particular at least 70% in the bound form are used to the best advantage. Depending on the content in ethylene oxide units and their position in the polyoxypropylene-polyoxyethylene-polyol, their reactivity and the miscibility of the prepared polyisocyanate mixtures containing urethan groups with the other starting materials can be selectively adjusted to the prevailing requirements.

As an example, cycloaliphatic triols, such as mixtures of cyclohexane-triol isomers, or preferably aliphatic triols, such as trimethylolpropane and especially glycerol are used as initial molecules for the preparation of polyoxypropylene-polyoxyethylene-polyols (b) in the presence of basic catalysts according to the invention. However, mixtures consisting of water and/or (cyclo)aliphatic diols and tri- and/or tetrafunctional alcohols, on the condition that the initial molecule possesses a functionality in the range from 2.5 to 3.5, are suitable.

The usual basic catalysts include, for example, alkali alkoxides with 1 to 4 carbon atoms in the alkyl residue, such as sodium methylate, sodium and potassium methylate, potassium isopropylate and sodium butylate, alkaline earth hydroxides, for example calcium hydroxide, and preferably alkali hydroxides, for example especially sodium and potassium hydroxide.

In order to prepare the polyisocyanate mixture (A) containing urethan groups, that can be used according to the invention in the preferred variant (I) of the process, the raw MDI (I) and the polyoxypropylene-polyoxyethylene-polyol (b) are brought to reaction at temperatures ranging from 0° to 120° C. preferably at 30° to 90° C., in such amounts that the ratio of the NCO—:OH groups amounts to 1:0.001 to 1:0.19, preferably 1:0.01 to 1:0.1. After a reaction period of 0.5 to 6 hours, preferably of 1 to 3 hours, the storage-resistant polyisocyanate mixture on MDI base (A) possessing an NCO groups content of 22 to 30 weight percent, is allowed to cool.

If the polyisocyanate mixtures (A) that can be used in the process according to the invention have been prepared according to process variant (II), a mixture of MDI isomers (II) or preferably 4,4'-MDI and as polyoxypropylene-polyoxyethylene-polyol (b) are brought to reaction at temperatures from 0° to 120° C., preferably from 30° to 90° C. in such a volume that the ratio of the NCO—:OH groups amounts to 1:0.001 to 1:0.2, preferably 1:0.02 to 1:0.15. After a reaction period of 0.5 to 6 hours, preferably from 1 to 3 hours, the quasi-prepolymer containing urethan groups on an MDI base with an NCO content of 10 to 19, preferably 12 to 18 weight percent, is allowed to cool and is then diluted with raw MDI (I), until its NCO content reaches 22 to 30 weight percent.

The polyisocyanate mixtures (A) containing urethan groups in a bound form, that can be used according to the invention and prepared according to process variants (I) and (II) are stable when stored at temperatures of −4° C. during a period of at least 12 weeks.

In order to prepare fluorochlorohydrocarbon-free soft polyurethan foams or soft, flexible polyurethan molding foams, the liquid polyisocyanate mixtures on MDI base (A), containing urethan groups in the bound form are brought to foam formation, as it has been stated previously, with the usual higher-molecular polyhydroxyl compounds (B) and possibly with lower-molecular chain extending and cross-linking agents (C) in the presence of propellants (D), catalysts (E) and if necessary, with auxiliary agents and/or additives (F) in open or closed molding tools.

The usual linear and/or branched polyester-polyols and especially polyester polyols with molecular weights from 800 to 8200, preferably from 1200 to 7000 and especially from 1800 to 6200 are used as the higher-molecular polyhydroxyl compounds (B). However, polymer-modified polyether-polyols, polyether-polyol dispersions and other polymers containing hydroxyl groups with the above-indicated molecular weights, for example polyester amides, polyacetals and/or polycarbonates, especially those prepared from diphenyl carbonate and 1,6-hexanediol[1] by ester interchange (double decomposition? ) or mixtures of at least two of the above-mentioned polyhydroxyl compounds may be also considered.

[1]Translator's note: hexamethylene glycol

For example, suitable polyester-polyols may be prepared from organic dicarboxylic acids with 1 to 12 carbon atoms, preferably aliphatic dicarboxylic acids with 4 to 6 carbon atoms and multivalent alcohols. preferably diols with 2 to 12 carbon atoms, preferably 2 to 6 carbon atoms, and/or dialkylene glycols. For example, the following may be taken into consideration as dicarboxylic acids: succinic, glutaric, adipic, suberic, azelaic, sebacic, decanediodic, maleic, fumaric, phthalic, isophthalic, and terephthalic acid. The dicarboxylic acids may be used alone or in mixture with each other. Instead of the free dicarboxylic acids, the corresponding dicarboxylic acid derivatives, such as dicarboxylic acid esters of alcohols with 1 to 4 carbon atoms or dicarboxylic acid anhydrides may be applied. Mixtures of dicarboxylic acids of succinic, glutaric, and adipic acids in volume ratio for example of 20 to 35, 35 to 50, 20 to 32 parts by weight, and especially adipic acid. The following are examples for divalent and higher alcohols, especially diols: ethanediol, diethylene glycol,, 1,2- respectively 1,3-propanediol, dipropylene glycol, 1,4-butanediol. 1–5 pentanediol, 1,6-hexanediol, 1,10-decanediol, glycerol, and trimethylolpropane. Ethanediol, diethylene glycol, 1,4-butanediol, 1,5-pentanediol, 1,6-hexanediol, or mixtures of at least two of the above-mentioned diols, especially mixtures of 1,4-butanediol, 1,5-pentanediol, 1,6-hexanediol, are advantageously used. Polyester-polyols from lactones, for example ε-caprolactone or hydroxycarboxylic acids, for example ω-hydroxycaproic acid could be also used.

The organic, for example aromatic and preferably aliphatic polycarboxylic acids and/or their derivatives and multivalent alcohols and/or alkylene glycols without catalyst or preferably in the presence of esterification catalysts, appropriately in an atmosphere of inert gases, such as nitrogen, helium, argon, etc. in the melt, advantageously at temperatures of 150° to 250° C., preferably at 180° to 220° C., possibly under reduced pressure, until the desired acid number is reached, which is advantageously less than 10 and preferably less than 2, can undergo polycondensation in order to prepare the polyester-polyols. According to a preferred way of execution, the esterification mixture is polycondensed at the above-mentioned temperatures to an acid number of 80 to 30, preferably 40 to 30, under normal pressure and subsequently under a pressure lower than 500 mbar, advantageously 50 to 150 mbar. As esterification catalysts, as an example, iron, cadmium, cobalt, lead, zinc antimony, magnesium, titanium, and tin catalysts, in form of metals, metal oxides, or metal salts may be considered. However, the polycondensation may be carried out in the liquid phase, in the presence of diluents and/or entraining agents, such as benzene, toluene, xylene or chlorobenzene, toward the azeotropic distillation of the condensation water.

To prepare the polyester-polyols, the organic polycarboxylic acids and/or derivatives and multivalent alcohols may advantageously undergo polycondensation at a mole ratio ranging from 1:1 to 1:8, preferably 1:1.05 to 1.2, The obtained polyester-polyols have advantageously a functionality of 2 to 4, especially 2 to 3, and a molecular weight of 800 to 3600, preferably 1200 to 3000 and especially 1800 to 2500.

However, polyether-polyols are used specifically as polyhydroxyl compounds; they are prepared on the basis of known processes, for example, by anionic polymerization with alkali hydroxides, such as sodium and potassium hydroxide, or alkali alcoholates, such as sodium methylate, sodium or potassium ethylate, or potassium isopropylate as catalysts while adding at least one initial molecule that contains 2 to 4, preferably 2 to 3 reactive hydrogen atoms in the bound form; they may be prepared also by cationic polymerization with Lewis acids such as antimony pentachloride, boron fluoride etherate, etc. or Fuller's earth as catalysts, from one or several alkylene oxides with 2 to 4 carbon atoms in the alkylene residue.

Suitable alkylene oxides are, for example, tetrahydrofuran, 1,3-propylene oxide, 1,2- respectively 2,3-butylene oxide, styrene oxide, preferably ethylene oxide and 1,2-propylene oxide. The alkylene oxides may be used individually, alternating with each other or as mixtures. As an example, the following compounds may be taken into consideration as initial molecules: water, organic dicarboxylic acids, such as succinic, adipic, phthallic and terephthallic acids, aliphatic and aromatic, possibly N-mono-, N,N- and N,N'-dialkyl substituted diamines with 1 to 4 carbon atoms in the alkyl residue, such as possibly mono- and dialkyl substituted ethylenediamine, ethylenetriamine, triethylenetetramine, 1,3-propylenetriamine, 1,3-, respectively 1,4-butylenediamine, 1,2-, 1,3-, 1,4-, 1,5- and 1,6-hexamethylenediamine, phenylenediamine, 2,3-, 2,4- and 2,6 toluylenediamine, and 4,4'-, 2,4'- and 2,2'-diaminodiphenyl-methane.

The following materials may be also considered for use as initial molecules: alkanolamines, such as for example ethanolamine, N-methyl- and N-ethyl-ethanolamine, dialkanolamines, such as for example diethanolamine, N-methyl- and N-ethyl-diethanolamine, and trialkanolamines, such as for example triethanolamine and ammonia. Multivalent especially di- and/or trivalent alcohols, such as ethanediol, 1,2- and 1,3-propanediol, diethylene glycol, dipropylene glycol, 1,4-butanediol, 1,6-hexanediol, glycerol, trimethylolpropane, and pentaerythritol are used advantageously.

The polyether-polyols, advantageously polyoxypropylene- and polyoxypropylene-polyoxyethylene-polyols, possess a functionality of 2 to 4, preferably 2 to 3, and molecular weights of 800 to 8200, preferably 1200 to 7000, and especially 1800 to 6200 and suitable polyoxy-tetramethylene glycols have a molecular weight up to about 3500.

In addition, polymer-modified polyether-polyols, preferably graft polyether-polyols, especially those on a styrene and/or acrylonitrile base, prepared in situ by the polymerization of acrylonitrile, styrene, or preferably mixtures of acrylonitrile and styrene, for example at a weight ratio of 90:10 to 10:90, preferably 70:30 to 30:70, prepared appropriately to the above-named polyether-polyols according to the data given An German Patent Specifications 11 11 394, 12 22 669 (U.S. Pat. No. 3,304,273, 3,383,351, 3,523,093), 11 52 536 (GB Pat. 10 40 452) and 11 52 537 (GB Pat. 987 618), and also polyether-polyol dispersions, which as the disperse phase contain in a mass of 1 to 50 weight percent, preferably 2 to 25 weight percent, as an example: polyureas, polyhydrazides, polyurethans containing tertiary amino groups in the bound form, and/or melamine and have been described in EP-B-011 752 (U.S. Pat. No. 4,304,708), US-A-4 374 209 and DE-A-32 31 497), are suited for use as polyether-polyols.

Like the polyester-polyols, the polyether-polyols can be used alone or in the form of mixtures. Moreover, they can be mixed with graft polyether-polyols or polyester-polyols and polyesteramides containing hydroxyl groups, polyacetals, and/or polycarbonates. As an example, mixtures with a functionality of 2 to 3 and a molecular weight of 800, to 8200, containing at least one polyether-polyol and at least one polymer-modified polyether-polyol from the graft polyether-polyol group, or polyether-polyol dispersions containing polyureas, polyhydrazides, or polyurethans which contain tertiary amino groups as the dispersed phase, yielded excellent results.

Compounds that can be prepared from the glycols, such as diethylene glycol, triethylene glycol, 4,4'-dihydroxyethoxy-diphenyldimethylmethane, hexanediol, and formaldehyde, are taken into consideration as polyacetals containing hydroxyl groups. Suitable polyacetals may be prepared also by the polymerization of cyclic acetals.

As polycarbonates exhibiting hydroxyl groups, the ones that in the already known way come into consideration are those, which can be prepared, for example, by reacting diols, such as 1,3-propanediol, 1,4-butanediol and/or 1,6 hexanediol, diethylene glycol, triethylene glycol, or tetraethylene glycol with diaryl carbonates, for example, diphenyl carbonate or phosgene.

The polyesteramides include the predominantly linear condensates, obtained from multivalent, saturated and/or unsaturated carboxylic acids, respectively their anhydrides and from multivalent, saturated and/or unsaturated amino alcohols or mixtures of multivalent alcohols and amino alcohols and/or polyamines.

The fluorochlorohydrocarbon-free soft polyurethan (molding) foams can be prepared without or with the use of chain extenders and/or cross-linking agents (C). However, the addition of such chain extending or cross-linking agents or possibly of their mixtures to modify the mechanical properties, such as hardness to modify the mechanical properties, such as hardness, could be found to be advantageous. Polyfunctional, especially bi- and trifunctional compounds with a molecular weight of 18 to about 400, preferably from 62 to about 300, can be considered for use as chain extenders and/or cross-linking agents. As an example, the following di- and/or trialkanolamines, such as diethanolamine and triethanolamine, alkylene glycols, for example diethylene and dipropylene glycol, aliphatic diols and/or triols with 2 to 6 carbon atoms in the alkylene residue, such as ethane-, 1,3-propane-, 1,4-butane, 1,5-pentane, 1,6-hexanediol, glycerol, and/or trimethylolpropane and lower-molecular ethoxylating and/or propoxylating products, prepared from the above-mentioned ditrioxylamines, diols, and/or triols, as well as from aliphatic and/or aromatic diamines, such as 1,2-ethane, 1,4-butane, 1,6-hexanediamine, 2,3-, 2,4- and/or 2,6 toluelenediamine,, 4,4'-diamino-diphenylmethane 3,3'- di and/or 3,3'- 5,5'-tetraalkyl-substituted 4,4'-diamino-phenylmethanes as initial molecules and alkylene oxide or alkylene mixtures.

Dialkanolamines, diols, and/or triols and especially diethanolamine, 1,6-hexanediol, 1,4-butanediol, trimethylolpropane and glycerol or mixtures made of these compounds are preferentially applied as chain extenders and/or cross-linking agents (C).

The chain extenders and/or cross-linking agents (C), used advantageously for the preparation of soft polyurethan (molding) foams, are applied appropriately at such weight ratios that of the higher-molecular polyhydroxyl compound (B) per mole 0.01 to 8 moles, especially 0.1 to 3 moles of the chain extending agent (b) are present in the reaction mixture.

Water, which reacts with isocyanate groups under the formation of carbon dioxide, is used especially as the propellant (D) for the preparation of soft polyurethan (molding) foams. The amounts of water, which are used expediently, amount to 0.1 to 8 parts by weight:, preferably 2.5 to 6.0 parts by weight and especially 3.3 to 4.3 parts; by weight, with respect to 100 parts by weight of the polyhydroxyl compound (B)

Other suitable propellants are liquids which are inert with respect to the liquid polyisocyanate mixtures (A), modified with urethan groups and have a boiling point below 100° C., preferably below 50° C., especially between −50° and 30° C. at atmospheric pressure, and thus they evaporate under the influence of the exothermic polyaddition reaction; additional agents consist of mixtures of such physically acting propellants and water. The following are examples of such preferentially applicable liquids: alkanes, for example, heptane, hexane, n- and iso-pentane, preferably technical mixtures of n- and iso-pentanes, n- and iso-butane and propane, cycloalkanes, such as cyclopentane and/or cyclohexane, ether, for example furan, dimethylether and diethylether, ketones, for example acetone and methylethylketone, carboxylic acid alkylester, such as methyl formiate, dimethyl oxalate and ethyl acetate and halogenated hydrocarbons, such as methylene chloride, dichloromonofluoromethane, difluoromethane, trifluoromethane, difluoroethane, tetrafluoroethane, chlorodifluoroethane, 1,1-dichloro-2,2,2-trifluorethane, 2,2-dichloro-2-fluoroethane, and heptafluoropropane. Mixtures of these low-boiling liquids with each other and/or with other substituted or unsubstituted hydrocarbons may be used. Moreover, organic carboxylic acids, such as formic acid, acetic acid, oxalic acid, ricinoleic acid and compounds containing carboxyl groups are also suitable.

Chlorodifluoromethane, chlorodifluoroethane, dichlorodifluoroethane, pentane mixtures, cyclohexane, and especially water and also mixtures of at least two of these propellants, for example, mixture of water and cyclohexane, mixtures of chlorodifluoromethane and 1-chloro-2,2-difluoroethane and possibly water are used advantageously as propellant. Fluorochlorohydrocarbons are not used as propellant because they harm the environment.

The required amount of physically acting propellants, depending on the desired foam density and the eventually used amount of water, can be determined quite simply by experiment; it adds up to about 0 to 25 parts by weight, preferably 0 to 15 parts by weight per 100 parts by weight of the polyhydroxyl compounds. In some cases it might be appropriate to mix the polyisocyanate mixtures (A) containing the urethan groups in a bound form with the inert, physically acting propellant, thereby reducing their viscosity.

Compounds, which strongly accelerate the reaction of the compounds containing hydroxyl groups of components (B) and possibly (C) with the liquid polyisocyanate mixtures on MDI-base (A) containing urethan groups in the bound form, are used advantageously as catalysts (E) to prepare fluorochlorohydrocarbon-free, soft, elastic polyurethan (molding) foams. Organometallic compounds, preferably organic tin compounds, such as tin-(II) salts of organic carboxylic acids, for example, tin-(II) acetate, tin-(II) octoate (caproate? ), tin-(II) ethylhexoate, and tin-(II) laurate and the diethyl tin-(IV) salts of organic carboxylic acids, for example, dibutyl tin diacetate, dibutyl tin dilaurate, dibutyl tin maleate, and dioctyl tin diacetate, and strongly basic amines, for example amidines, such as for example 2,3-dimetyl-3,4,5,6,-tetrahydropyrimidine, tertiary amine, such as triethylamine, tributylamine, dimethylbenzylamine, N-methyl-, N-ethyl-, N-cyclohexyl-morpholine, N,N,N′,N′-tetramethylethylenediamine, 1,6-N,N,N′,N′-tetramethylbutanediamine, 1,6-N,N,N′,N′-tetramethylbutanediamine, 1,6-N,N,N′,N′-tetramethylhexanediamine, di-(4-dimethylaminocyclohexyl)-methane, pentamethyl-diethylenetriamine, tetramethyldiaminoethylether, bis-(dimethylaminopropyl)-urea, dimethylpiperazine 1,2-dimethylimidazol, 1-diazabicyclo(2,2,-2)octane, and alkanolamine compounds, such as triethanolamine, triisopropanolamine, N-methyl- and N-ethyl-diethanolamine, and dimethylethanolamine, may be considered.

The following may be also taken into consideration as catalyts: tris-dialkyl-aminoalkyl)-s-hexahydrotriazines, especially tris-(N,N-di-methylaminopropyl)-s-hexahydrotriazine, tetraalkylammoniumhydroxides, such as tetramethylammoniumhydroxide, alkali hydroxides, such as sodium hydroxides, and alkali alcoholates, such as sodium methylate and potassium isopropylate, and also sodium salts of long-chain fatty acids with 10 to 20 C atoms and possibly with OH groups in the side chain, and combinations of the organometallic compounds and strongly basic amines. The preferred amounts to be used are 0.001 to 5 weight percent, especially 0.05 to 2 weight percent catalyst, respectively catalyst combination with respect of the weight of the polyhydroxyl compound (B).

Auxiliary materials and/or additives (F) may be incorporated into the reaction mixture used for the preparation of soft polyurethan molding foams. As an example, surfactants, foam stabilizers, cell control agents, fillers, dyestuffs, pigments, flame-proofing agents, fungistatic and bacteriostatic agents may be cited.

As an example, compounds, which promote the homogenization of the raw materials and possibly are also suited to regulate the cell structure may be considered to be used as surfactants. Emulsifiers, such as sodium salts of castor oil sulfates or of fatty acids and also salts of fatty acids with amines, for example diethylamine oleate, diethanolamine stearate, diethanolamine ricinoleate, salts of sulfonic acid, for example, alkali or ammonium salts of dodecylbenzene or dinaphthylmethanedisulfonic acid and ricinoleic acid; foam stabilizers, such as siloxane-oxalkylene mixed polymerizates and other organopolysiloxanes, oxyethylated alkylphenols, oxyethylated fatty alcohols paraffinic oils, castor oil, respectively ricinoleic acid ester, Turkish red oil and peanut oil, and cell regulator, such as paraffins fatty alcohols and dimethylpolysiloxanes may be listed. Oligomeric polyacrylates with polyoxyalkylene and fluoroalkane residues in the side chains are also suited to improve the emulsifying action, the cell structure and/or the stabilization of the foam. The surface-active materials are usually applied in amounts of 0.01 to 5 parts per weight with respect to 100 parts by weight of the polyhydroxyl compound (B).

The usual, already known organic or inorganic filling materials, strengthening agents and extenders are to be used as fillers. The following are listed as an example: inorganic fillers, such as silicate minerals, such as stratification silicates like antigorite, serpentine, hornblende, amphibole, chrysotile, zeolite, talcum; metal oxides, such as kaoline, aluminum oxides, aluminum silicate, titanium and iron oxides, metal salts, such as chalk, barite, and inorganic pigments, such as cadmium sulfide, zinc sulfide, and also glass particles. The following organic fillers may be taken into consideration: soot, melamine, colophonium, cyclopentadiene resins and graft polymerizates.

The inorganic and organic fillers may be used individually or as mixtures and are advantageously incorporated into the reaction mixture in amounts from 0.5 to 50 weight percent, preferably 1 to 40 weight percent, with respect to the weight of components (A) to (C).

Suitable flame retardants are, for example, tricresyl phosphate, tris. (2-chloroethyl) phosphate, tris-(2-chloropropyl) phosphate, tris-(1,3. dichloropropyl) phosphate, tris-(2,3-dibromopropyl) phosphate, and tetrakis-(2-chloroethyl)-ethylene diphosphate.

In addition to the already mentioned halogen-substituted phosphates, inorganic flame retardants, such as red phosphorus, aluminum oxidehydrate, antimony trioxide, arsenic oxide, ammonium polyphosphate, swollen graphite, and calcium sulfate or cyanuric acid derivatives, such as melamine or mixtures of at least two flame arresters, such as ammonium polyphosphate and/or swollen graphite and possibly starch for the flame-proofing of the soft polyurethan (molding) foam prepared according to the process described in the invention. In general it was found expedient to use 5 to 50 parts by weight, preferably 5 to 25 parts by weight of the above-mentioned flame arresters or mixtures for each 100 parts by weight of components (A) to (C).

Further details concerning the above-mentioned other customary auxiliary materials and additives, one should consult the technical literature, for example, the monograph "High Polymers" by J. H. Saunders and K. C. Frisch, volume XVI, Polyurethans, Part i and 2, Interscience Publishers, 1962, respectively 1964, or the Plastics Handbook, Polyurethans, Vol. VII, Carl-Hanser Publishers, Munich, Vienna, 1st and 2nd Edition, 1966 and 1983.

In order to prepare the soft polyurethan (molding) foams, the liquid polyisocyanate mixtures (A), which contain the urethan groups in the bound form, the higher-molecular polyhydroxyl compounds (B) and eventually chain-extending and/or cross-linking agents (C) are brought to reaction in the presence of propellants (D), catalysts (E) and possibly auxiliary materials and/or additives (F) at temperatures ranging from 0° to 100° C., preferably at 15° to 80° C. at such mass ratios that for each NCO group 0.5 to 2, preferably 0.8 to 1.3 and especially about one reactive hydrogen atom(s) is/are present bound to the initial components (B) and eventually (C), and if water is used as propellant, the molar ratio of water equivalents to NCO group equivalents should amount to 0.5 to 5:1, preferably 0.7 to 0.95:1 and especially 0.75 to 0.85:1.

The soft polyurethan (molding) foams are prepared expediently by the one-shot process by mixing two components, whereby the initial components (B), (D), (E) and possibly (C) and (F) are combined with the so-called polyol component and as the polyisocyanate component, the polyisocyanate mixture, which contains the urethan groups in bound form, is used possibly admixed with (F) and with inert, physically acting propellants. Since the polyol component and the polyisocyanate component have an excellent stability when stored, they must be only strongly mixed before the preparation of the soft polyurethan (molding) foams. The foaming operation of the reaction mixture can be carried out in open or closed molding tools; moreover, the mixture is well suited to prepare blocks of expanded (foamy) material.

In order to prepare soft polyurethan foams, the reaction mixture is brought advantageously at a temperature of 15° to 80° C., preferably at 30° to 65° C. into a preferably metallic molding tool that can be brought to the desired temperature. The temperature of the molding tool is usually 20° to 90° C., preferably 35° to 70° C., The reaction mixture is allowed to harden in the closed molding tool, for example, under compression degrees of 1.1 to 8, advantageously at 2 to 6 and especially 2.2 to 4.

The soft polyurethan foams possess free foam densities of 30 to 50 g/l, advantageously 32 to 45 g/l and especially 36 to 42 g/l. The soft elastic polyurethan foam molds, prepared on the basis of such a formulation, possess in function of the applied compression grade, an overall density of 36 to 52 g/l, advantageously 38 to 44 g/l.

The soft polyurethan foams prepared by the process according to the invention are suited to be used for seat cushions of upholstered furniture and the soft polyurethan molded foam material may be used a upholstering elements, arm rests, head supports, sun screens (visors) and safety covers in car cabins, especially in automobiles and planes.

EXAMPLE

Preparation of the polyoxypropylene-polyoxyethylene-polyols

Example 1

In a 10-liter stirring autoclave a mixture of 212 g glycerol and 36.8 g 47 weight percent aqueous potassium hydroxide solution was processed for I hour at 90° C. under a reduced pressure of 1.3 mbar to form the alcoholate. Afterward, under addition of dry nitrogen, the pressure in the stirring autoclave was increased to 2.5 bar and the obtained initial mixture was alkoxylated with a mixture consisting of 2606 g ethylene oxide and 2712 g 1,2-propylene oxide at a temperature of 105° C. for 6 hours.

Afterward, the free alkylene oxides were removed under a reduced pressure (1.3 mbar) and after relieving the stirrer autoclave, 80 g water and 200 g adsorption agent were incorporated in the reaction mixture. After stirring for 2 hours, all solids were separated by pressure filtration and the thus purified polyoxypropylene-polyoxyethylene-polyol was dried for 3 hours under reduced pressure at 1.3 mbar and 100° C. In order to stabilize it, 1500 ppm di-tert.-butyl-cresol were dissolved in the product.

The thus obtained polyoxypropylene-polyoxyethylene-polyol possessed a hydroxyl number of 69, a secondary hydroxyl groups content of 91%, a viscosity of 420 mPas, measured at 25° C. and a water content of 0.025 weight percent. The polymerized, in statistical distribution bound ethylene oxide groups amounted to 49 weight percent, with respect to the total weight on polymerized ethylene and 1,2-propylene oxide groups.

Comparative Samples I to XIV

The process was carried out as indicated in Example I; however, the initial molecules and 1,2-propylene oxide (PO): ethylene oxide weight ratios indicated in Table 1 were used.

TABLE 1

POLYOXYPROPYLENE-POLYOXYETHYLENE-POLYOLS USED FOR COMPARISON

| COMPARISON EXAMPLE | INITIAL MOLECULE | PO:EO WEIGHT RATIO | POLYOXYPROPYLENE-POLYOXYETHYLENE-POLYOLS, RESPECTIVELY POLYOXYPROPYLENE-OR POLYOXYETHYLENE-POLYOLS | | |
|---|---|---|---|---|---|
| | | | HYDROXYL NUMBER | VISCOSITY mPas AT 25#C. | WATER CONTENT (WT. %) |
| I | GLYCEROL | 100:0 | 328 | 300 | 0.03 |
| II | GLYCEROL | 100:0 | 70 | 415 | 0.02 |
| III | GLYCEROL | 100:0 | 37.5 | 660 | 0.02 |
| IV | GLYCEROL | 80:20 | 330 | 250 | 0.03 |
| V | GLYCEROL | 80:20 | 36 | 740 | 0.02 |
| VI | PROPYLENE GLYCOL | 100:0 | 25.5 | 860 | 0.01 |
| VII | PROPYLENE GLYCOL | 100:0 | 250 | 50 | 0.03 |
| VIII | GLYCEROL | 51:49 | 35.5 | 950 | 0.01 |
| IX | GLYCEROL | 25:75 | 70 | 480 | 0.01 |
| X | GLYCEROL | 25:75 | 35 | 1260 | 0.01 |
| XI | PROPYLENE GLYCOL | 51:49 | 71 | 240 | 0.01 |
| XII | PROPYLENE GLYCOL | 25:75 | 71 | 300 | 0.02 |
| XIII | GLYCEROL | 0:100 | 70 | SOLID | 0.01 |
| XIV | GLYCEROL | 0:100 | 35.4 | SOLID | 0.01 |

Preparation of polyisocyanate mixtures containing urethan groups in the bound form (A)

Two-stage variant of the process

Example 2

562 parts by weight polyoxypropylene-polyoxyethylene-polyol, prepared as indicated in Example 1, were added under stirring at 80° C. to a mixture of 611 parts by weight 4,4' MDI and 0.4 parts by weight benzoyl chloride. After a post-reaction period of 2 hours at 80° C., the polyisocyanate mixture modified with urethan groups on 4,4' base was allowed to cool to 40° C. and was diluted with 3324 parts raw MDI, which contained After a post-reaction period of one hour, the polyisocyanate mixtures containing the urethan groups on MDI base were allowed to cool to temperature. The product had an NCO content of 27.8 weight percent, a viscosity of 120 mPas at 25° C. and contained a weight ratio of 12.5 weight percent polyoxypropylene-polyoxyethylene polyol with respect to the total weight.

Comparison Examples XV to XXVII

The process was carried out as indicated in Example 2; however the polyoxyalkylene-polyols (PE) and 4,4'-MDI and raw MDI, described in Table 2 and prepared according to comparison examples I to XIV, were used in the indicated amounts.

TABLE 2

COMPARISON EXAMPLES XV TO XXVIII; POLYISOCYANATE MIXTURES CONTAINING URETHANE GROUPS

| COMPARISON EXAMPLES | (POLYOXYPROPYLENE)-(POLYOXYETHYLENE)-POLYOL(PE) ACCORDING TO COMP. EX. | | | 4,4'-MDI (PBW) | RAW-MDI COMPOSITION | | | | |
|---|---|---|---|---|---|---|---|---|---|
| | NCO-CONTENT (pbw) | POLYOL-CONTENT (pbw) | | | AMOUNT (pbw) | 4,4'-MDI (pbw) | 2,4'-MDI (pbw) | 2,2'-MDI (pbw) | TRI- AND HIGHER FUNCTIONAL PARTS |
| XV | 25.1 | 12.4 | I | 1280 | 2720 | 6484 | 42.01 | 20.84 | 0.8 | 36.34 |
| XVI | 27.8 | 12.4 | II | 576 | 626 | 2957 | 50.98 | 17.65 | 0.68 | 30.69 |
| XVII | 28.1 | 12.4 | III | 500 | 488 | 3013 | 51.89 | 17.32 | 0.66 | 30.12 |
| XVIII | 25.2 | 12.4 | IV | 300 | 640 | 1500 | 42.0 | 20.88 | 0.81 | 36.3 |
| XIX | 27.9 | 12.4 | V | 400 | 380 | 2420 | 52.08 | 17.25 | 0.66 | 30.0 |
| XX | 27.6 | 12.4 | VI | 400 | 365 | 2435 | 52.38 | 17.15 | 0.66 | 29.8 |
| XXI | 25.8 | 12.4 | VII | 400 | 728 | 2072 | 44.03 | 20.15 | 0.77 | 35.04 |
| XXII | 28.3 | 12.5 | VIII | 400 | 378 | 2422 | 51.12 | 17.24 | 0.66 | 29.97 |
| XXIII | 27.9 | 12.5 | IX | 400 | 436 | 2364 | 50.95 | 17.66 | 0.68 | 30.71 |
| XXIV | 28.2 | 12.5 | X | 400 | 382 | 2420 | 52.08 | 17.25 | 0.66 | 30.0 |
| XXV | 27.9 | 12.5 | XI | 400 | 439 | 2360 | 50.86 | 17.69 | 0.68 | 30.76 |
| XXVI | 27.9 | 12.5 | XII | 400 | 439 | 2360 | 50.86 | 17.69 | 0.68 | 30.76 |
| XXVII | 27.8 | 12.5 | XIII | 400 | 436 | 2364 | 50.95 | 17.66 | 0.68 | 30.71 |
| XXVIII | 28.2 | 12.5 | XIV | 400 | 382 | 2420 | 52.08 | 17.25 | 0.66 | 30.0 |

1694.8 parts by weight (59.49 weight percent) 4,4' MDI,
22.5 parts by weight (0.34 weight percent) 2,2' MDI,
586.7 parts by weight (18.48 weight percent) 2,4' MDI and
1020 parts by weight (30.69 weight percent) tri- and higher functional polyphenyl-polymethylene-polyisocyanate.

The obtained product contained 27.4 weight percent NCO; it had a viscosity of 128 mPas at 25° C. and a portion by weight of 12.5 weight percent of the polyoxypropylene-polyoxyethylene-polyol with respect to the total weight.

One-stage variant of the process

Example 3

To a mixture of 30627 parts by weight raw MDI, which consisted of
17948 parts by weight (58.03 weight percent) 4,4'-MDI,
4565,5 parts by weight (15.77 weight percent) 2,4'-MDI,
174.9 parts by weight (0.29 weight percent) 2,2'-MDI and
7937.7 parts by weight (25.91 weight percent) tri- and higher functional polyphenyl-polymethylene-polyisocyanates were added under stirring at 80° C. within a period of 1 hour
4373 parts by weight polyoxypropylene-polyoxyethylene polyol, prepared according to Example 1.

Preparation of the Polyurethan Molded Foams

Example 4

Polyol components: Mixture, which consisted of
  93.08 weight fractions of a polyoxypropylene started with glycerol (86 weight percent) polyoxyethylene (14 weight percent) block polyols with a hydroxyl number of 28, corresponding to a molecular weight of about 6000,
  2.5 weight fractions of a polyoxypropylene (30 weight percent) polyoxyethylene (70 weight percent) polyols with a hydroxyl number of 42, corresponding to a molecular weight of about 4010, and statistical distribution of the polymerized alkylene oxide groups,
  3.3 weight fractions of water,
  0.12 weight fractions of a 70-weight percent solution of bis(dimethylaminoethyl) ether in dipropyleneglycol,
  0.45 weight fractions of a 33-weight percent solution of diazabicyclo(2,2,2)-octane in dipropylene glycol,
  0.45 parts by weight of 2-(2-dimethylaminoethoxy) ethanol, and
  0.10 parts by weight of a silicon-based stabilizer (Tegostab(R)B 8680 made by Goldschmidt AG, Essen)
Polyisocyanate component: polyisocyanate mixture modified with urethane groups, prepared in accordance with example 2

To prepare the soft-elastic PU mold foam material the polyol and polyisocyanate components were vigorously mixed at 23° C. in amounts corresponding to an isocyanate index of 80. Approximately 750 g of the reaction mixture thus obtained were placed in a metallic mold with inside dimension of 40×40×10 cm and heated to 45° C., the mold was then closed and the reaction mixture was allowed to foam up. The soft elastic PU molded piece thus formed was unmolded after 5 minutes.

The mechanical properties measured on the PU molded pieces are described in Table 3.

Example 5

Polyol component: analogous to Example 4
Polyisocyanate component: polyisocyanate mixture modified with urethan groups in accordance with Example 3

The production of the soft-elastic polyurethan molded foam material was accomplished analogously to the description given for Example 4.

The measured mechanical properties obtained for the PU molded piece thus obtained are described in Table 3.

Comparison Examples XXIX to XLII

The method followed was analogous to the description of Example 4; but used the polyisocyanate mixtures modified with urethane groups named in Table 3, which were prepared in accordance with comparison examples XV to XXVIII.

The measured mechanical properties of the PU molded pieces thus obtained are summarized in Table 3.

tively. Although the PU molded foam material made in accordance with-Comparison Example XXIX had a volume density of 42.65 g/l, it exhibited a crush hardness of 3.45 kPa and had an unacceptable compression deformation residue of 31.5%.

Method for preparation of fluorochlorohydrocarbon-free (FCHC-free) low-density polyurethan soft-foam materials and soft-elastic polyurethan soft-foam materials as well as polyisocyanate mixtures modified with urethane groups, and based on diphenylmethane-diisocyanate, which are applicable thereto.

SUMMARY

The subjects of the invention are a method for the preparation of FCHC-free polyurethan soft (molded) foam materials with low density, by reacting A) liquid polyisocyanate mixtures containing bound urethane groups, containing 22 to 30 weight percent of NCO groups, which in turn are prepared by reacting a mixture of diphenylmethane-diisocyanate and polyphenyl-polymethylene-polyisocyanates (raw MDI) with at least one polyoxypropylene-polyoxyethylene-polyol with a functionality between 2.5 and 3.5, a hydroxyl number between 50 and 90 and a polymerized ethylene oxide group concentration ranging from more than 30 to less than 50 weight percent, relative to the weight of the polymerized ethylene oxide and 1,2 propylene oxide groups, or by reacting of 4,4' diphenylmethane-diisocyanate (MDI) or and MDI-isomeric mixture with the above-named polyoxypropylene-polyoxyethylene-polyol to an NCO-group-containing quasi-prepolymer, and diluting this quasi-

TABLE 3

MECHANICAL PROPERTIES OF THE SOFT-ELASTIC POLYURETHANE MOLDED FOAM MATERIALS IN ACCORDANCE WITH EX. 4 & 5 AND COMP. EX. XXIX TO XLII.

| EX. | COMP. EX. | POLYISOCYANATE MIXTURE IN ACCORD. W/EX. OR COMP. EX. | DENSITY ACCORD. TO DIN 53 420 (g/l) | MECHANICAL PROPERTIES ||||
|---|---|---|---|---|---|---|---|
| | | | | TENSILE STRENGTH/DIN 53 571 (kPa) | TENSILE STRAIN/DIN 53 571 (%) | COMPRESSIVE DEFORMATION RESIDUE/DIN 53 572 (%) | CRUSH HARDNESS AT 40% CRUSH/ DIN 53 577 (kPa) |
| 4 | — | 2 | 42.6 | 80.5 | 103 | 6.45 | 1.8 |
| 5 | — | 3 | 42.6 | 75.1 | 108 | 6.2 | 1.9 |
| — | XXIX | XV | 42.65 | 75.5 | 74 | 31.5 | 3.45 |
| — | XXX | XVI | 50.6 | 73.5 | 99 | 5.6 | 3.05 |
| — | XXXI | XVII | 47.7 | 81.0 | 110 | 6.1 | 2.85 |
| — | XXXII | XVIII | 52.7 | 83 | 74 | 10.5 | 4.7 |
| — | XXXIII | XIX | 48.15 | 84 | 103 | 6.4 | 3.6 |
| — | XXXIV | XX | 47.8 | 87 | 114 | 7.85 | 3.35 |
| — | XXXV | XXI | 48.7 | 79 | 114 | 6.3 | 3.25 |
| — | XXXVI | XXII | 45.8 | 73 | 98 | 5.75 | 2.7 |
| — | XXXVII | XXIII | 45.4 | 55.5 | 83 | 5.15 | 2.5 |
| — | XXXVIII | XXIV | 45.3 | 49.6 | 76.5 | 4.45 | 2.65 |
| — | XXXIX | XXV | 44.7 | 80.4 | 75.5 | 6.1 | 2.65 |
| — | XL | XXVI | 47.9 | 60.7 | 92.4 | 4.35 | 2.8 |
| — | XLI | XXVII | 45.9 | 47.1 | 76.2 | 6.1 | 2.7 |
| — | XLII | XXVIII | 46.4 | 55.6 | 84.5 | 6.1 | 2.75 |

The volume densities of the soft-elastic polyurethan molded foam materials made in accordance with Examples 2 and 3, which were 42.6 g/l, were very low in comparison to the volume densities of the polyurethan molded foam materials from the comparison examples which were prepared using the same polyol components. Despite this low volume density the mechanical properties of the polyurethan molded foam materials were at least comparable, and in many cases even better. In particular, for the polyurethan soft foam materials expanded with water, the crush hardness exhibited the surprisingly low values of 1.8 kPa and 1.9 kPa, respecprepolymer with raw-MDI, with B) higher-molecular polyhydroxyl compounds and, if appropriate C) low-molecular chain lengthening and/or cross-linkage-promoting materials in the presence of D) propellants, E) catalysts as well as, if appropriate.

F) auxiliary materials and/or additives, and the polyisocyanate mixtures modified with urethan groups (A) which are utilizable in accordance with this invention.

We claim:

1. A process for the preparation of fluorochlorohydrocarbon-free polyurethane soft foams and soft flexible polyurethane molding foams comprising the reaction of
   A) liquid polyisocyanate mixtures, which contain urethane groups in the bound form on a diphenylmethane base, with
   B) higher-molecular polyhydroxyl compounds; in the presence of
   C) propellants; and
   D) catalysts;
   wherein the liquid polyisocyanate mixture containing the urethane groups in the bound form (A) has an NCO-group content of 22 to 40 weight percent with respect to the total weight and are obtained
   I) by reacting
      a) a mixture (I) consisting of diphenylmenthane diisocyanates and Polyphenyl-polymethylene-polyisocyanates with a diphenylmethane-diisocyanate isomers content of 35 to 94 weight percent with respect of the total weight, having
      b) at least one polyoxypropylene-polyoxyethylene-polyol (b) with a functionality of 2.5 to 3.5, with a hydroxyl number of 50 to 90 and a polymerized ethylene oxide groups content ranging from more than 30 to less than 50 weight percent with respect to the polymerized ethylene oxide and 1,2-propylene oxide groups or
   II) by diluting
      c) a urethane-groups-containing quasiprepolymer with an NCO content ranging from 10 to 19 weight percent, obtained by reacting a 4,4'-diphenylmethane diisocyanate or a mixture of diphenylmethane diisocyanate isomers (II) with the aforementioned polyoxypropylene-polyoxyethylene-polyol (b), with a mixture (I) consisting of diphenylmethane-diisocyanates and polyphenyl-polymethylene-polyisocyanates.

2. Process according to claim 1, wherein Mixture (I) consisting of diphenylmethane-diisocyanates and polyphenyl-polymethylene-polyisocyanates contains with respect to the total weight
   Ia1) 34 to 65 weight percent 4,4'-diphenylmethane diisocyanate,
   Ia2) 1 to 25 weight percent 2,4'-diphenylmethane-diisocyanate,
   Ia3) 0 to 4 weight percent 2,2'-diphenylmethane-diisocyanate and
   Ia4) 65 to 6 weight percent at least trifunctional polyphenyl-polymethylene-polyisocyanate.

3. Process according to claim 1, wherein the mixture of the diphenylmethane-diisocyanate isomers (II) contains with respect to the total weight
   Iia1) 90 to 48 weight percent 4,4'-diphenylmethane diisocyanate,
   Iia2) 10 to 48 weight percent 2,4'-diphenylmethane diisocyanate, and
   Iia3) 0 to 4 weight percent 2,2'-diphenylmethane-diisocyanate.

4. Process according to claim 1, wherein the polyoxypropylene-polyoxyethylene-polyols (b) for the preparation of the urethane-groups-containing polyurethane polyisocyanate mixture possess (A) functionality of 2.5 to 3.0, a hydroxyl number of 65 to 75, and a polymerized ethylene oxide group content of 45 to 49 weight percent with respect to the weight of the polymerized ethylene oxide and 1,2 propylene oxide groups.

5. Process according to claim 1, wherein the polyoxypropylene-polyoxyethylene-polyols (b) for the preparation of the urethane-groups-containing polyisocyanate mixture (A), contain polymerized ethylene oxide and 1,2 propylene oxide in a bound form, in a statistical distribution and have a secondary hydroxyl-group content of at least 50%.

6. Process according to claim 1, wherein polyether polyols with a functionality of 2 to 3 and a molecular weight of 800 to 8200 or mixtures with a functionality of 2 to 3 and a molecular weight of 800 to 8200 are used as higher-molecular polyhydroxy compounds (B) from such polyether polyols and polymer-modified polyether polyols from the group of graft polyether polyols or polyether-polyol dispersions, which contain as a dispersed phase polyureas, polyhydrazides or polyurethanes with tertiary amino groups in the bound form.

7. Process according to claim 1, wherein water is used as propellant (C).

8. The process of claim 1 wherein liquid polyisocyanate mixtures A) and higher-molecular polyhydroxyl compounds B) are further reacted with an agent E) selected from the group consisting of lower molecular chain extending agents and crosslinking agents.

9. The process of claim 1 further comprising the reaction of reactants A) and B) in the presence of propellants C), catalysts D), and one or more agents F) selected from the group consisting of auxiliary materials, additives, and mixtures thereof.

10. The process of claim 8 further comprising the reaction of reactant A), reactant B), and agent E) in the presence of propellants C), catalysts D), and one or more agents F) selected from the group consisting of auxiliary materials, additives, and mixtures thereof.

11. A process for the preparation of fluorochlorohydrocarbon-free polyurethane soft foams and soft flexible polyurethane molding foams comprising the reaction of
   A) a liquid polyisocyanate mixture, having urethane groups in the bound form on a diphenylmethane base; with
   B) a higher-molecular polyhydroxyl compound; in the presence of
   C) one or more propellants; and
   D) one or more catalysts;
   wherein said liquid polyisocyanate mixture A) has an NCO-group content of 22 to 40 weight percent with respect to the total weight and is obtained by reacting
      a) a mixture (I) consisting of diphenylmenthane diisocyanates and polyphenyl-polymethylene-polyisocyanates with a diphenylmethane-diisocyanate isomers content of 35 to 94 weight percent with respect of the total weight; with
      b) at least one polyoxypropylene-polyoxyethylene-polyol (b) having a functionality of 2.5 to 3.5, a hydroxyl number of 50 to 90 and a polymerized ethylene oxide groups content ranging from more than 30 to less than 50 weight percent with respect to the polymerized ethylene oxide and 1,2propylene oxide groups.

12. A process for the preparation of fluorochlorohydrocarbon-free polyurethane soft foams and soft flexible polyurethane molding foams comprising the reaction of
   A) a liquid polyisocyanate mixture, having urethane groups in the bound form on a diphenylmethane base; with B) a higher-molecular polyhydroxyl compound; in the presence of
C) propellants; and
E) catalysts;
wherein said liquid polyisocyanate mixture A) has an NCO-group content of 22 to 40 weight percent with respect to the total weight and is obtained by mixing
   c) a urethane-groups-containing quasiprepolymer having an NCO content ranging from 10 to 19 weight percent, said quasiprepolymer obtained by reacting a 4,4'-diphenylmethane diisocyanate or a mixture of diphenylmethane diisocyanate isomers (II) with the aforementioned polyoxy-propylene-polyoxy-ethylene-polyol (b); with
d) a mixture (I) consisting of diphenylmethane-diisocyanates and polyphenyl-polymethylene-polyisocyanates.

* * * * *